United States Patent
Uchino et al.

(10) Patent No.: US 9,820,284 B2
(45) Date of Patent: Nov. 14, 2017

(54) MOBILE COMMUNICATION SYSTEM

(71) Applicant: NTT DOCOMO, INC., Tokyo (JP)

(72) Inventors: Tooru Uchino, Tokyo (JP); Hideaki Takahashi, Tokyo (JP); Kazuki Takeda, Tokyo (JP); Yuichi Kakishima, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/029,663

(22) PCT Filed: Oct. 10, 2014

(86) PCT No.: PCT/JP2014/077138
§ 371 (c)(1),
(2) Date: Apr. 15, 2016

(87) PCT Pub. No.: WO2015/056638
PCT Pub. Date: Apr. 23, 2015

(65) Prior Publication Data
US 2016/0249362 A1    Aug. 25, 2016

(30) Foreign Application Priority Data
Oct. 16, 2013  (JP) ................................ 2013-215486

(51) Int. Cl.
*H04W 52/54*    (2009.01)
*H04W 72/04*    (2009.01)
(Continued)

(52) U.S. Cl.
CPC ......... *H04W 72/0473* (2013.01); *H04L 5/001* (2013.01); *H04W 52/146* (2013.01);
(Continued)

(58) Field of Classification Search
CPC .............................. H04W 52/54; H04B 7/005
(Continued)

(56) References Cited

U.S. PATENT DOCUMENTS

| 6,259,927 B1 * | 7/2001 | Butovitsch ............. H04B 7/022 455/442 |
| 2004/0009784 A1 * | 1/2004 | Ohkubo .............. H04W 52/143 455/522 |

(Continued)

OTHER PUBLICATIONS

International Search Report issued in corresponding application No. PCT/JP2014/077138 mailed Jan. 13, 2015 (2 pages)
(Continued)

*Primary Examiner* — John J Lee
(74) *Attorney, Agent, or Firm* — Osha Liang LLP

(57) ABSTRACT

An object is to appropriately perform transmission power control on a mobile station (UE) when performing "Inter-eNB CA" by using cells under the control of plural radio base stations (eNB). In a mobile communication system according to the present invention, each of plural radio base stations (eNB#1, eNB#2) reduces, upon detecting that the mobile station (UE) is performing transmission at a maximum transmission power ($P_{CMAX, c}$), by a predetermined amount a transmission power of the mobile station (UE) in a cell (#1/#2A to #2C) under the control thereof and notifies other radio base station (eNB) of the predetermined amount.

2 Claims, 6 Drawing Sheets

(51) Int. Cl.
  *H04W 52/34*  (2009.01)
  *H04W 52/14*  (2009.01)
  *H04L 5/00*  (2006.01)
  *H04W 52/38*  (2009.01)
  *H04W 92/20*  (2009.01)
  *H04W 52/36*  (2009.01)

(52) U.S. Cl.
  CPC ......... *H04W 52/34* (2013.01); *H04W 52/386* (2013.01); *H04L 5/0053* (2013.01); *H04W 52/367* (2013.01); *H04W 92/20* (2013.01)

(58) Field of Classification Search
  USPC ....... 455/522, 452.1, 452.2, 509, 500, 67.11, 455/69
  See application file for complete search history.

(56) References Cited

U.S. PATENT DOCUMENTS

| | | | | |
|---|---|---|---|---|
| 2004/0198235 | A1* | 10/2004 | Sano | H04B 7/00 455/69 |
| 2007/0184863 | A1* | 8/2007 | Takagi | H04W 52/346 455/507 |
| 2008/0043657 | A1* | 2/2008 | Ishii | H04L 1/0003 370/311 |
| 2013/0017855 | A1* | 1/2013 | Hui | H04W 16/28 455/522 |
| 2014/0003341 | A1* | 1/2014 | Hu | H04W 52/146 370/328 |

OTHER PUBLICATIONS

Written Opinion of the International Searching Authority issued in corresponding application No. PCT/JP2014/077138 dated Jan. 13, 2015 (3 pages).
Pantech, "Challenge on UL transmission of dual connectivity"; 3GPP TSG-RAN WG2 Meeting #83, R2-132504; Barcelona, Spain; Aug. 19-23, 2013 (8 pages).
LG Electronics Inc., "Management of UE Transmit Power in Dual Connectivity"; 3GPP TSG-RAN2 Meeting #83, R2-132582; Barcelona, Spain; Aug. 19-13, 2013 (2 pages).
Samsung, "Scheduling Information handling in inter-ENB carrier aggregation"; 3GPP TSG-RAN WG2 Meeting #83bis, R2-133259; Ljubljana, Slovenia; Oct. 7-11, 2013 (2 pages).
Huawei, HiSilicon, "Throughput results for inter-frequency deployment of small cells"; 3GPP TSG-RAN WG2 Meeting #82, R2-131782; Fukuoka, Japan; May 20-24, 2013 (5 pages).
Extended European Search Report issued Sep. 15, 2016, in corresponding European Patent Application No. 14853964.6 (6 pages).

* cited by examiner

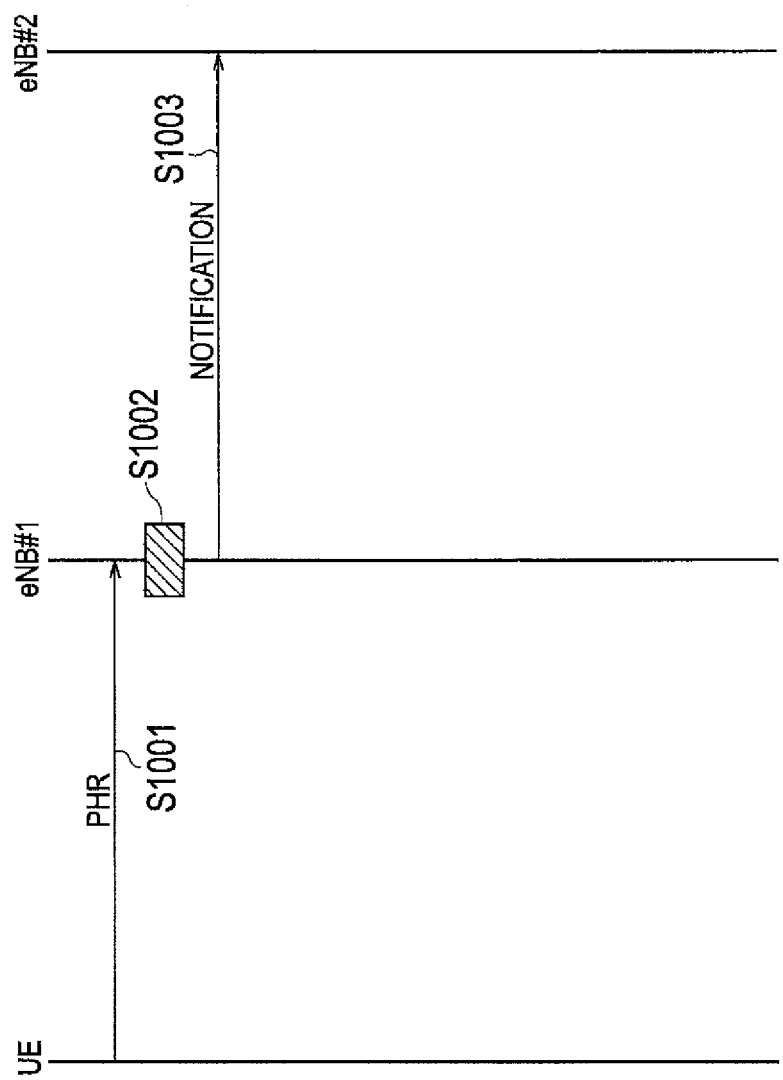

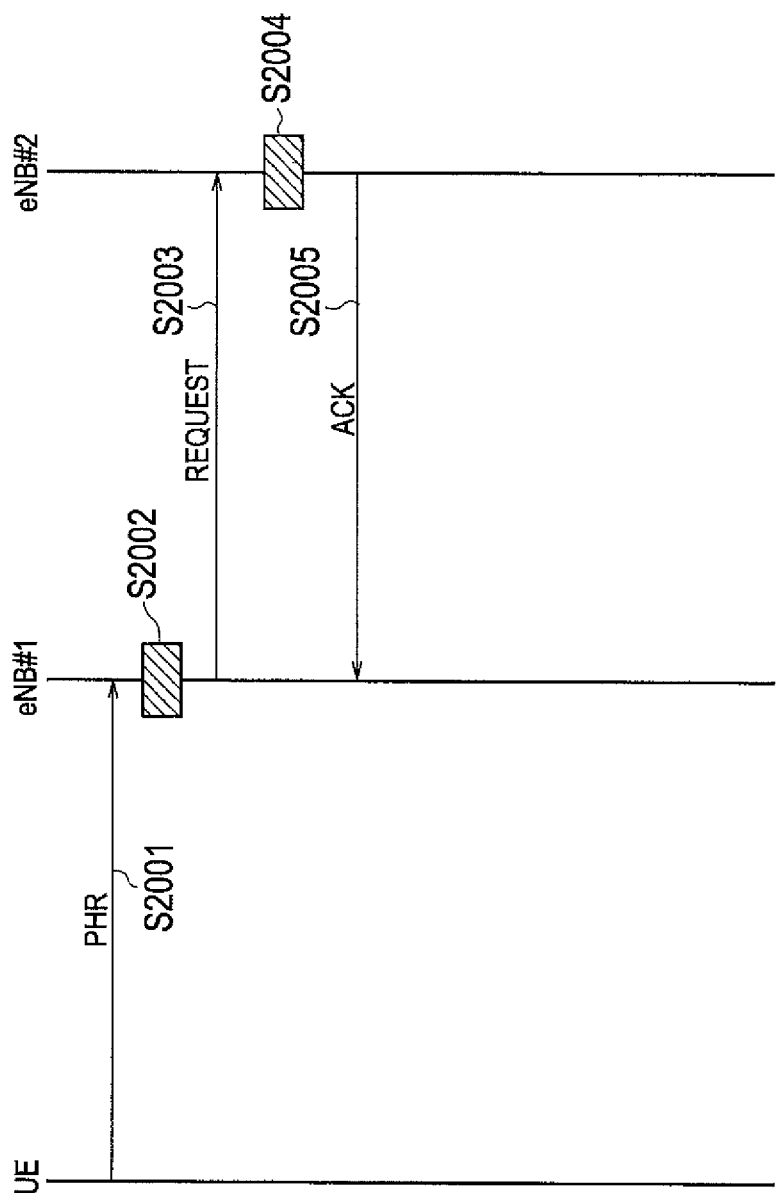

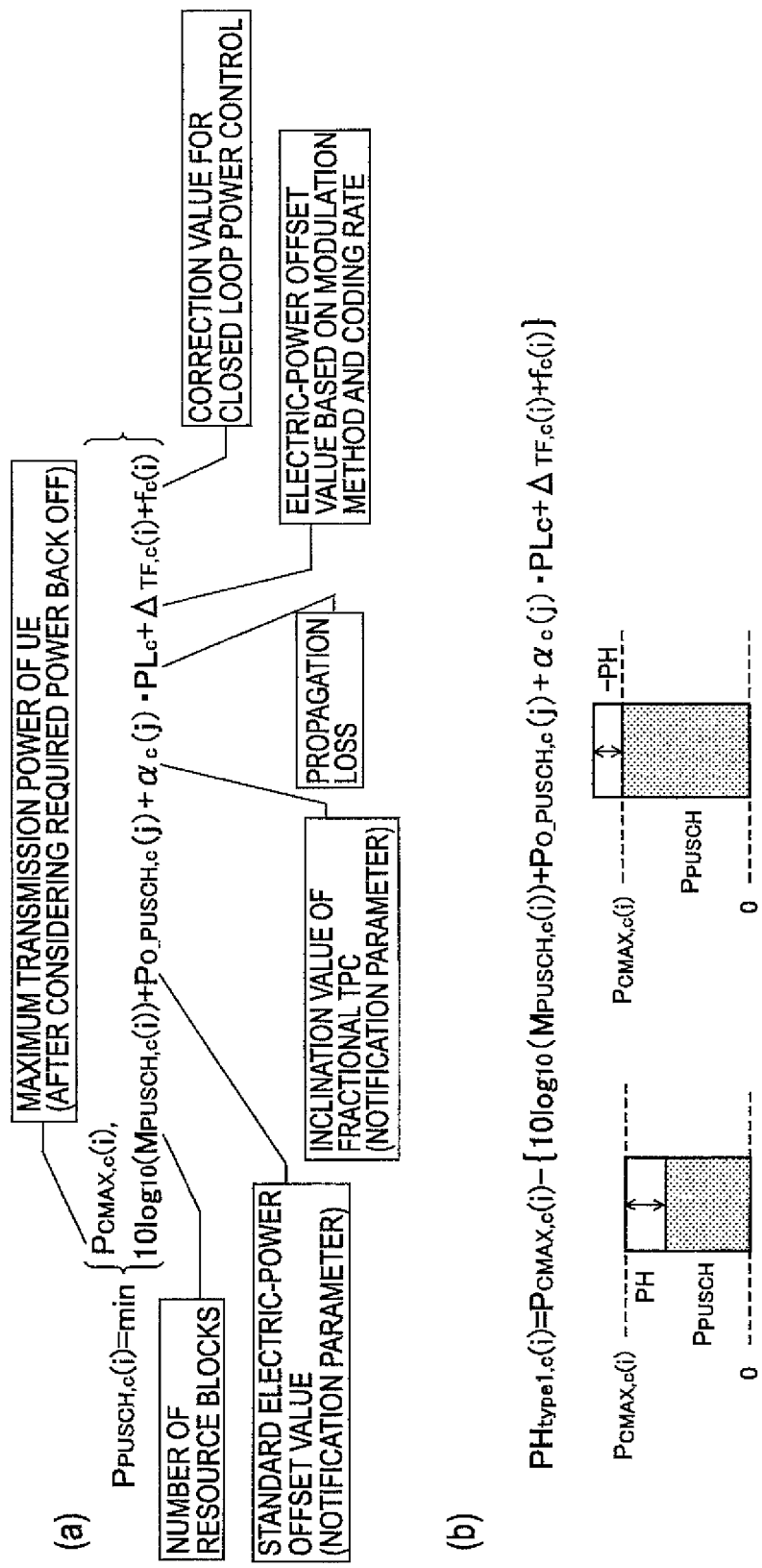

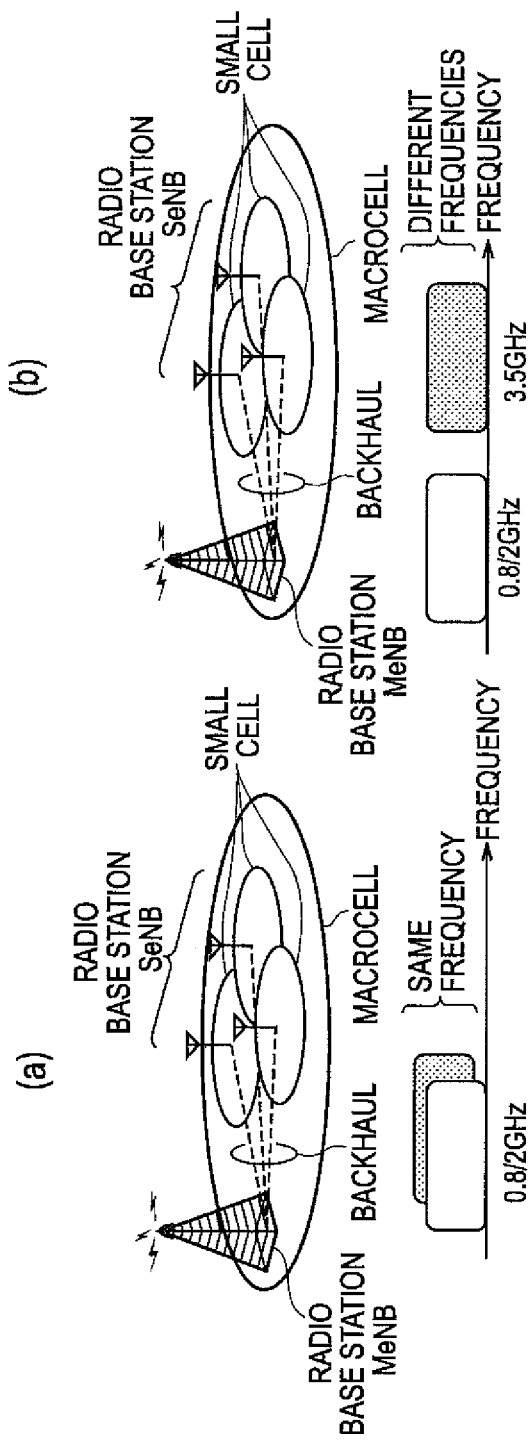

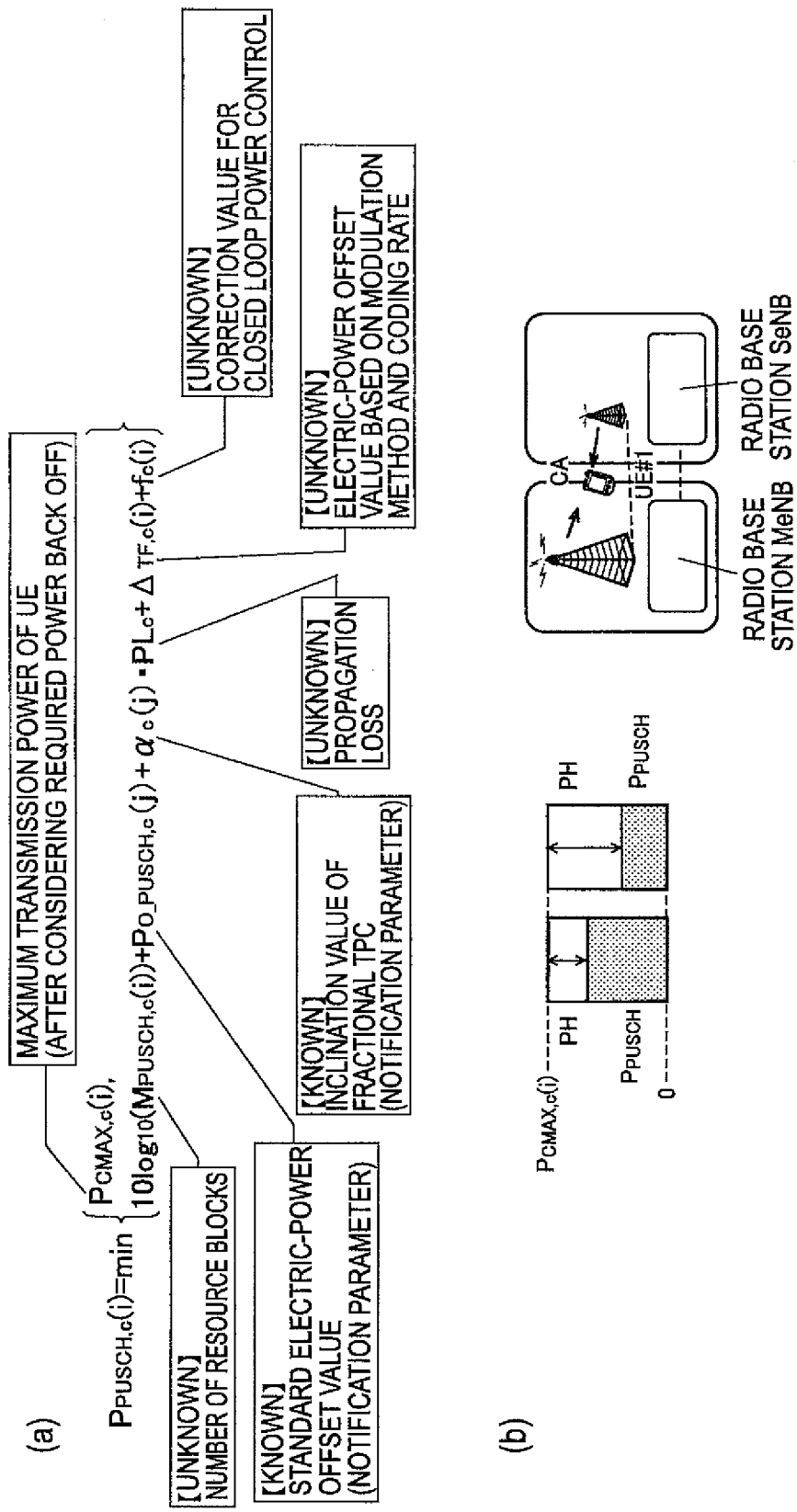

MOBILE COMMUNICATION SYSTEM

TECHNICAL FIELD

The present invention relates to a mobile communication system.

BACKGROUND ART

In the LTE (Long Term Evolution) system, a mobile station UE#i determines, based on a formula shown in FIG. 5(a), a transmission power $P_{PUSCH, c}(i)$ of PUSCH (Physical Uplink Shared Channel) in a cell (or CC: Component Carrier) #c for every TTI (Transmission Time Interval).

Among the variables included in the formula shown in FIG. 5(a), $P_{CMAX, c}(i)$ is a maximum transmission power of the mobile station UE#i after considering a required power back-off in a cell #c; $M_{PUSCH, c}(i)$ is number of resource blocks assigned to the mobile station UE#i in the cell #c; $P_{o\_PUSCH, c}(j)$ is a standard electric-power offset value notified in the cell #c; $\alpha_c(j)$ is an inclination value of Fractional TPC (Transmission Power Control) notified in the cell #c; $PL_c$ is a propagation loss (path loss) in the cell #c measured by the mobile station UE#i; $\Delta_{TF, c}(i)$ is an electric-power offset value determined based on a modulation method and a coding rate used in the mobile station UE#i; and $f_c(i)$ is a correction value for closed loop power control used in the mobile station UE#i.

Among the variables included in the formula shown in FIG. 5(a), the propagation loss $PL_c$ is unknown to a radio base station eNB. Therefore, when the propagation loss $PL_c$ changes, the mobile station UE#i feeds back PHR (Power Headroom Report) as shown in FIG. 5(b).

PH is a difference between the maximum transmission power $P_{CMAX, c}(i)$ of the mobile station UE#i and a current transmission power $P_{PUSCH, c}(i)$ of the mobile station UE#i calculated by using the formula shown in FIG. 5(a). The calculated difference may be a positive or a negative value.

Moreover, in a mobile communication system of the LTE system, as shown in FIGS. 6(a) and 6(b), an overlaying configuration in which small cells are deployed on the coverage of a macrocell that uses an existing frequency (for example, 0.8/2 GHz) can be used.

The small cells, as shown in FIG. 6(a), can operate at the same frequency as that of the macrocell, or can operate at a different frequency (for example, 3.5 GHz) from that of the macrocell, as shown in FIG. 6(b).

Moreover, the small cells can be operated by a remote radio equipment (RRE) that is centrally controlled by a radio base station MeNB that controls the macrocell, or can be operated by a radio base station SeNB that differs from the radio base station MeNB, as shown in FIGS. 6(a) and 6(b).

The radio base station MeNB and the radio base station SeNB are connected via a backhaul line, in which delay time cannot be ignored, and these radio base stations mutually exchange the information. A transmission delay of the backhaul can be up to few tens of microseconds.

Moreover, in Release-12 of the LTE system, CA (Carrier Aggregation) used till Release-10 of the LTE system has been expanded, and performing "Inter-eNB CA", in which high throughput can be achieved by performing a simultaneous communication using cells (or CC) under the control of plural radio base stations eNB that are connected via the backhaul is being studied (see Non-Patent Document 1).

PRIOR ART DOCUMENT

Non-Patent Document

Non-Patent Document 1: 3GPP Contribution R2-131782

SUMMARY OF THE INVENTION

However, in the "Inter-eNB CA" that is currently being studied, among plural radio base stations eNB, scheduling control or transmission power control is independently performed, and therefore, had a problem where each radio base station eNB could not completely comprehend a status of a transmission power of a mobile station UE#i.

Specifically, as shown in FIG. 7(a), for each radio base station eNB, variables used in cells under the control of other radio base stations eNB, particularly, number of resource blocks $M_{PUSCH, c}(i)$, a propagation loss $PL_c$, an electric-power offset value $\Delta_{TF, c}(i)$, and a closed loop power control value $f_c(i)$ are unknown. Therefore, as shown in FIG. 7(b), there was a problem that each radio base station eNB could not estimate, even after receiving the PHR in cells under the control of other radio base stations eNB from a mobile station UE, the status of the transmission power of the mobile station UE#i in the cells.

The present invention is made in view of the above circumstances. One object of the present invention is to provide a mobile communication system that can appropriately perform transmission power control on a mobile station UE when performing "Inter-eNB CA" by using cells under the control of plural radio base stations eNB.

According to a first aspect of the present embodiment, in a mobile communication system in which a mobile station is capable of performing carrier aggregation by using cells under the control of plural radio base stations, each of the plural radio base stations reduces, upon detecting that the mobile station is performing transmission at a maximum transmission power, by a predetermined amount a transmission power of the mobile station in a cell under the control thereof and notifies other radio base station of the predetermined amount.

According to a second aspect of the present embodiment, in a mobile communication system in which a mobile station is capable of performing carrier aggregation by using cells under the control of plural radio base stations, each of the plural radio base stations requests, upon detecting that the mobile station is performing transmission at a maximum transmission power, other radio base station to reduce a transmission power of the mobile station in a cell under the control of the other radio base station.

BRIEF DESCRIPTION OF DRAWINGS

FIG. 3 is a sequence diagram that shows an operation of the mobile communication system according to the first embodiment of the present invention.

FIG. 4 is a sequence diagram that shows an operation of a mobile communication system according to a first modification example of the present invention.

FIG. 5 is a view for explaining a conventional technology.
FIG. 6 is a view for explaining a conventional technology.
FIG. 7 is a view for explaining a conventional technology.

DETAILED DESCRIPTION

Mobile Communication System According to First Embodiment of Present Invention

Figure 1:
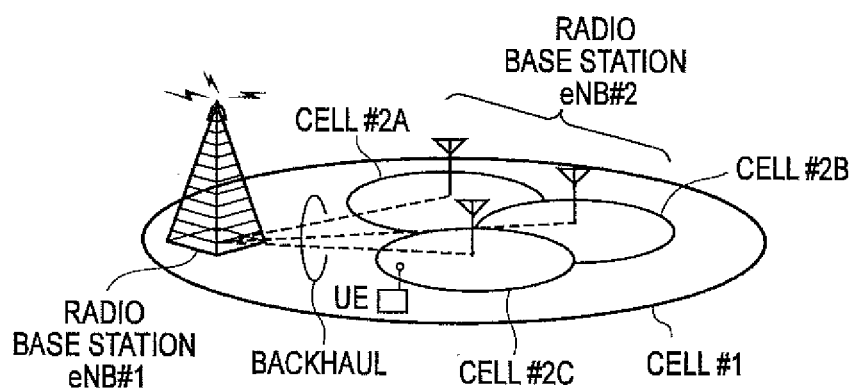
FIG. 1 is an overall structural diagram of a mobile communication system according to a first embodiment of the present invention.
Figure 2:
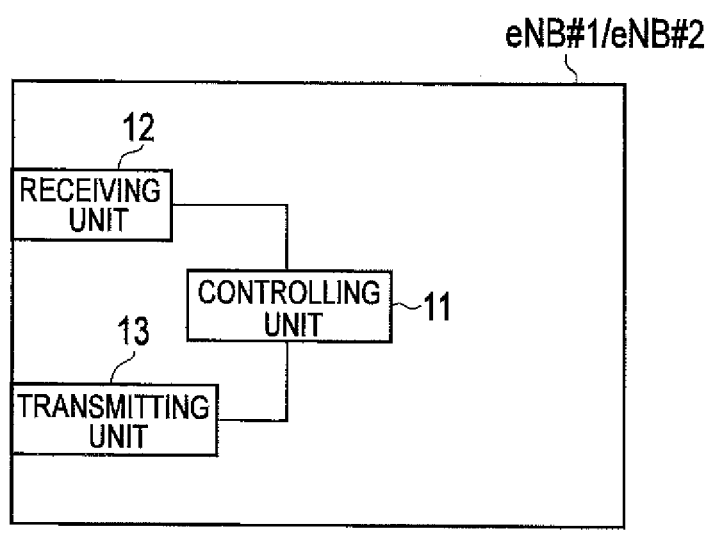
FIG. 2 is a functional block diagram of a radio base station eNB#1 or eNB#2 according to the first embodiment of the present invention.

Referring now to FIGS. 1 to 3, a mobile communication system according to a first embodiment of the present invention will be explained below. The mobile communication system according to the present embodiment will be explained with an example of a mobile communication system of the LTE system. The present invention, however, can be applied to a mobile communication system other than that of the LTE system.

As shown in FIG. 1, the mobile communication system according to the present embodiment includes a radio base station eNB#1 that controls a cell #1, and a radio base station eNB#2 that controls cells #2A to #2C.

In the mobile communication system according to the present embodiment, the radio base station eNB#1 is a master radio base station (or, a macro radio base station) MeNB, and the radio base station eNB#2 is a slave radio base station (or, a small radio base station) SeNB.

Moreover, in the mobile communication system according to the present embodiment, the cell #1 is a macrocell, and the cells #2A to #2C are small cells. In the cell #1, CC#1 is used, and in the cells #2A to #2C, CC#2 is used.

Furthermore, in the mobile communication system according to the present embodiment, a mobile station UE is capable of performing "Inter-eNB CA" by using the cell #1 (CC#1) under the control of the radio base station eNB#1 and the cells #2A to #2C (CC#2) under the control of the radio base station eNB#2.

As shown in FIG. 2, the radio base station eNB#1 or eNB#2 includes a controlling unit 11, a receiving unit 12, and a transmitting unit 13.

The controlling unit 11 of the radio base station eNB#1 is capable of performing control on communication with the mobile station UE or the radio base station eNB#2. The receiving unit 12 of the radio base station eNB#1 is capable of receiving various signals from the mobile station UE or the radio base station eNB#2. The transmitting unit 13 of the radio base station eNB#1 is capable of transmitting various signals to the mobile station UE or the radio base station eNB#2.

The controlling unit 11 of the radio base station eNB#2 is capable of performing control on communication with the mobile station UE or the radio base station eNB#1. The receiving unit 12 of the radio base station eNB#2 is capable of receiving various signals from the mobile station UE or the radio base station eNB#1. The transmitting unit 13 of the radio base station eNB#2 is capable of transmitting various signals to the mobile station UE or the radio base station eNB#1.

In the radio base station eNB#1, the controlling unit 11 is capable of reducing, upon detecting that the mobile station UE is performing transmission at a maximum transmission power $P_{CMAX, c}$ (so-called power ceiling level), by a predetermined amount a transmission power of the mobile station UE in the cell #1 under the control thereof, and the transmitting unit 13 is capable of notifying the radio base station eNB#2 of the predetermined amount.

Similarly, in the radio base station eNB#2, the controlling unit 11 is capable of reducing, upon detecting that the mobile station UE is performing transmission at a maximum transmission power $P_{CMAX, c}$, by a predetermined amount a transmission power of the mobile station UE in the cells #2A to #2C under the control thereof, and the transmitting unit 13 is capable of notifying the radio base station eNB#1 of the predetermined amount.

The controlling unit 11 in the radio base station eNB#1 or eNB#2 is capable of detecting, based on the PHR transmitted by the mobile station UE, that the mobile station UE is performing transmission at the maximum transmission power $P_{CMAX, c}$.

For example, the controlling unit 11 in the radio base station eNB#1 or eNB#2 can reduce, by reducing the number of resource blocks to be assigned to the mobile station UE, by a predetermined amount the transmission power of the mobile station UE.

Moreover, the controlling unit 11 in the radio base station eNB#1 or eNB#2 is capable of further reducing, upon still detecting that the mobile station UE is performing transmission at the maximum transmission power $P_{CMAX, c}$ even after reducing by the predetermined amount the transmission power of the mobile station UE, by a predetermined amount the transmission power of the mobile station UE.

Furthermore, determination regarding whether the mobile station UE is performing transmission at the maximum transmission power $P_{CMAX, c}$ or not (in other words, determination of power ceiling level for the above-mentioned transmission power of the mobile station UE) can be periodically performed.

Moreover, the reduction amount of the transmission power of the mobile station UE can be changed step-by-step. According to the above characteristic, by increasing the reduction amount of the transmission power of the mobile station UE step-by-step, the attainment of the power ceiling level for the transmission power of the mobile station UE can be prevented at an early stage.

The transmitting unit 13 in the radio base station eNB#1 can notify the radio base station eNB#2 of the above-mentioned predetermined amount via an X2 interface, or can notify the radio base station eNB#2 of the above-mentioned predetermined amount via the mobile station UE.

Referring now to FIG. 3, an example of how the mobile communication system according to the present embodiment operates will be explained below.

As shown in FIG. 3, at step S1001, the mobile station UE transmits the PHR to the radio base station eNB#1.

At step S1002, based on the received PHR, the radio base station eNB#1 reduces, upon detecting that the mobile station UE is performing transmission at a maximum transmission power $P_{CMAX, c}$, by a predetermined amount a transmission power of the mobile station UE in the cell #1 under the control thereof. At step S1003, the radio base station eNB#1 notifies the radio base station eNB#2 of the predetermined amount.

First Modification Example

Referring now to FIG. 4, a mobile communication system according to a first modification example of the present invention will be explained below while focusing on the points of difference with the mobile communication system of the first embodiment.

In the mobile communication system according to the first modification example, when the controlling unit 11 in the radio base station eNB#1 detects that the mobile station UE is performing transmission at a maximum transmission power $P_{CMAX, c}$, the transmitting unit 13 requests the radio base station eNB#2 to reduce the transmission power of the mobile station UE in the cells #2A to #2C under the control of the radio base station eNB#2.

Similarly, when the controlling unit 11 in the radio base station eNB#2 detects that the mobile station UE is performing transmission at a maximum transmission power $P_{CMAX,\ c}$, the transmitting unit 13 requests the radio base station eNB#1 to reduce the transmission power of the mobile station UE in the cell #1 under the control of the radio base station eNB#1.

The transmitting unit 13 can notify, while performing the request, of an amount of the transmission power of the mobile station UE desired to be reduced.

Moreover, when the controlling unit 11 in the radio base station eNB#1 reduces, as per the above-mentioned request, the transmission power of the mobile station UE in the cell #1, the transmitting unit 13 can return ACK to the radio base station eNB#2.

On the other hand, if the controlling unit 11 in the radio base station eNB#1 cannot reduce, as per the above-mentioned request, the transmission power of the mobile station UE in the cell #1, the transmitting unit 13 can return NACK to the radio base station eNB#2, or can notify the radio base station eNB#2 of an amount of the transmission power that can be reduced.

Similarly, when the controlling unit 11 in the radio base station eNB#2 reduces, as per the above-mentioned request, the transmission power of the mobile station UE in the cells #2A to #2C, the transmitting unit 13 can return an ACK to the radio base station eNB#1.

On the other hand, if the controlling unit 11 in the radio base station eNB#2 cannot reduce, as per the above-mentioned request, the transmission power of the mobile station UE in the cells #2A to #2C, the transmitting unit 13 can return NACK to the radio base station eNB#1, or can notify the radio base station eNB#1 of a maximum amount of the transmission power that can be reduced.

The transmitting unit 13 in the radio base station eNB#1 can return the above-mentioned request, ACK, NACK, or notification to the radio base station eNB#2 via the X2 interface, or can return the above-mentioned request, ACK, NACK, or notification to the radio base station eNB#2 via the mobile station UE.

Similarly, the transmitting unit 13 in the radio base station eNB#2 can return the above-mentioned request, ACK, NACK, or notification to the radio base station eNB#1 via the X2 interface, or can return the above-mentioned request, ACK, NACK, or notification to the radio base station eNB#1 via the mobile station UE.

Referring now to FIG. 4, an example of how the mobile communication system according to the first modification example operates will be explained below.

As shown in FIG. 4, at step S2001, the mobile station UE transmits the PHR to the radio base station eNB#1.

At step S2002, the radio base station eNB#1 detects, based on the received PHR, that the mobile station is performing transmission at the maximum transmission power $P_{CMAX,\ c}$. At step S2003, the radio base station eNB#1 requests the radio base station eNB#2 to reduce the transmission power of the mobile station UE in the cells #2A to #2C.

At step S2004, the radio base station eNB#2 reduces the transmission power of the mobile station UE in the cells #2A to #2C. At step S2005, the radio base station eNB#2 returns ACK to the radio base station eNB#1.

The characteristic of the present embodiments explained above can be expressed as follows.

According to a first aspect of the present embodiment, in a mobile communication system in which a mobile station UE is capable of performing "Inter-eNB CA (carrier aggregation)" by using cells #1 and #2A to #2C under the control of plural radio base stations eNB#1 and eNB#2, each of the plural radio base stations eNB#1 and eNB#2 reduces, upon detecting that the mobile station UE is performing transmission at a maximum transmission power $P_{CMAX,\ c}$, by a predetermined amount a transmission power of the mobile station UE in a cell #1 or #2A to #2C under the control thereof and notifies other radio base station eNB of the predetermined amount.

According to the above aspect, when the mobile station UE is performing the "Inter-eNB CA" by using the cells #1 and #2A to #2C under the control of the radio base stations eNB#1 and #2, the radio base station eNB#1 or eNB#2 can appropriately perform transmission power control on the mobile station UE without knowing a status of a transmission power in other radio base station eNB corresponding to the mobile station UE.

In the above first aspect of the present embodiment, each of the plural radio base stations eNB#1 and eNB#2 can perform the notification via the mobile station UE.

According to the above aspect, because the notification is not transmitted via a backhaul line between the radio base station eNB#1 and the radio base station eNB#2, a propagation delay corresponding to the notification can be evaded.

According to a second aspect of the present embodiment, in a mobile communication system in which a mobile station UE is capable of performing "Inter-eNB CA" by using cells #1 and #2A to #2C under the control of plural radio base stations eNB#1 and eNB#2, each of the plural radio base stations eNB#1 and eNB#2 requests, upon detecting that the mobile station UE is performing transmission at a maximum transmission power $P_{CMAX,\ c}$, other radio base station eNB to reduce a transmission power of the mobile station UE in a cell under the control of the other radio base station eNB.

According to the above aspect, when the mobile station UE is performing the "Inter-eNB CA" by using the cells #1 and #2A to #2C under the control of the radio base stations eNB#1 and #2, the radio base station eNB#1 or eNB#2 can appropriately perform the transmission power control on the mobile station UE without knowing a status of a transmission power in the other radio base station eNB corresponding to the mobile station UE.

In the above second aspect of the present embodiment, the request can include an amount of the transmission power desired to be reduced of the mobile station UE.

According to the above aspect, an excessive reduction of the transmission power of the mobile station UE can be evaded in the radio base station eNB#1 or eNB#2.

In the above second aspect of the present embodiment, each of the plural radio base stations eNB#1 and eNB#2 can perform the request via the mobile station UE.

According to the above aspect, because the notification is not transmitted via a backhaul line between the radio base station eNB#1 and the radio base station eNB#2, a propagation delay corresponding to the request can be evaded.

The operations of the radio base station eNB#1, eNB#2, or the mobile station UE can be realized by hardware such as a circuit, can be realized by a software module executed by a processor, or can be realized by the combination of these.

The software module can be arranged in a storage medium having a desired form such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, a CD-ROM, and the like.

The storage medium is connected to a processor so that the processor can read/write information from/in the storage medium. Alternatively, the storage medium can be integrated in a processor. Alternatively, the storage medium and the processor can be arranged in ASIC. The ASIC can be arranged in the radio base station eNB#1, eNB#2, or the mobile station UE. The storage medium and the processor can be arranged as a discrete component in the radio base station eNB#1, eNB#2, or the mobile station UE.

The present invention has been explained in detail by using the above-mentioned embodiments; however, it is obvious for a person skilled in the art that the present invention is not limited to the embodiments explained in the present description. The present invention can be implemented by way of modifications and changes without deviating from the gist and the range of the present invention specified by the claims. Accordingly, the indication of the present description aims at exemplary explanation, and has no intention to limit to the present invention.

The entire contents of Japanese Patent Application 2013-215486 (filed on Oct. 16, 2013) are incorporated in the description of the present application by reference.

INDUSTRIAL APPLICABILITY

As explained above, according to the present invention, it is possible to provide a mobile communication system that can appropriately perform transmission power control on a mobile station UE when performing "Inter-eNB CA" by using cells under the control of plural radio base stations eNB.

EXPLANATION OF REFERENCE NUMERALS

UE Mobile station
eNB#1/eNB#2 Radio base station
11 Controlling unit
12 Receiving unit
13 Transmitting unit

The invention claimed is:

1. A mobile communication system in which a mobile station performs carrier aggregation by using cells under the control of plural radio base stations, wherein
at least one of the plural radio base stations reduces, by a predetermined amount, a transmission power of the mobile station in a cell under the control thereof and notifies other radio base station of the predetermined amount,
wherein the predetermined amount is a difference between a transmission power before reduction and a transmission power after reduction.

2. The mobile communication system according to claim 1, wherein the at least one of the plural radio base stations performs the notification via the mobile station.

* * * * *